(12) United States Patent
Krehbiel et al.

(10) Patent No.: US 6,671,777 B1
(45) Date of Patent: Dec. 30, 2003

(54) DATA STORAGE SYSTEM AND METHOD FOR MANAGING CRITICAL DATA IN AN N-WAY MIRRORED STORAGE DEVICE USING FIRST AND SECOND SEQUENCE NUMBERS

(75) Inventors: Stanley E. Krehbiel, Wichita, KS (US); William P. Delaney, Wichita, KS (US); Donald R. Humlicek, Wichita, KS (US); Gregory A. Yarnell, Wichita, KS (US); Joseph G. Moore, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 261 days.

(21) Appl. No.: 09/883,141

(22) Filed: Jun. 15, 2001

(51) Int. Cl.[7] .................. G06F 12/16; G06F 13/00; G06F 11/10
(52) U.S. Cl. .................. 711/114; 711/162; 714/6; 714/20
(58) Field of Search .................. 711/114, 162; 714/6, 20

(56) References Cited

U.S. PATENT DOCUMENTS

| | | | | |
|---|---|---|---|---|
| 5,632,027 A | * | 5/1997 | Martin et al. | 711/170 |
| 5,822,782 A | * | 10/1998 | Humlicek et al. | 711/170 |
| 6,332,177 B1 | * | 12/2001 | Humlicek | 711/114 |
| 6,553,511 B1 | * | 4/2003 | DeKoning et al. | 714/6 |
| 2002/0078315 A1 | * | 6/2002 | Howard et al. | 711/162 |

* cited by examiner

Primary Examiner—Glenn Gossage
(74) Attorney, Agent, or Firm—Suiter West PC LLO

(57) ABSTRACT

A data storage system and a method of managing data in the storage system. A method of performing a write to a data storage system, including a first storage device and a second storage device, may include writing a first set of header information to a first storage device and a second storage device. The first set of header information includes a first sequence number and a second sequence number, in which the first set of header information includes a first sequence number incremented to indicate a change from the second sequence number. The method may also include returning status of completion of writing the second set of header information. Invalid data or an interruption may also be detected by examining the first and second sequence numbers. Data is written to the first storage device and the second storage device. Then, a second set of header information is written to a first storage device and a second storage device. The second set of header information includes a first sequence number and a second sequence number, in which the second set of header information includes a second sequence number incremented to correspond to the first sequence number.

24 Claims, 7 Drawing Sheets

DATA STORAGE SYSTEM AND METHOD FOR MANAGING CRITICAL DATA IN AN N-WAY MIRRORED STORAGE DEVICE USING FIRST AND SECOND SEQUENCE NUMBERS

FIELD OF THE INVENTION

The present invention generally relates to the field of data storage, and particularly to a method for managing critical data in an N-way mirrored storage device.

BACKGROUND OF THE INVENTION

Persistent, efficient and safe storage of electronic data is of the utmost importance. Every aspect of modern life, from electronic commerce, storage of business and personal information, and the like have as a necessary and integral component the use and storage of electronic data. One method utilized to ensure access to electronic data is the use of a storage system employing a plurality of separate electronic data storage devices. For example, a storage system may include a variety of disk drives arranged in a redundant array of independent disks (RAID) format, with data mirrored across the plurality of disks. In this way, should one device become unavailable, data may be accessed from one of the other devices.

Users of an N-Way Mirrored storage system may write data using a variety of mechanisms. For example, a write may be performed using both non-critical and critical writes. Non-critical writes are typically write operations for which interruptions, or partially-completed operations, need not be detected and/or corrected. Critical writes typically include operations for which interruptions are detected and/or corrected. Correction may include, for instance, ensuring that copies of the data on a storage device are the same, even if the data represents only a partially completed critical write operation. However, during a critical write, an interruption may occur which may call into question the validity of the data. Such an interruption may defeat the very purpose of a data storage system, namely the establishment of a valid data set, especially in an environment in which devices may be added and/or removed, and in which recovery from interruption during an update of the storage devices may be achieved.

Therefore, it would be desirable to provide a method of managing data in a storage system.

SUMMARY OF THE INVENTION

Accordingly, the present invention is directed to a method of managing data in a storage system. In a first aspect of the present invention, a method of performing a write to a data storage system including a first storage device and a second storage device includes writing a first set of header information to a first storage device and a second storage device. The first set of header information includes a first sequence number and a second sequence number, in which the first set of header information includes a first sequence number incremented to indicate a change from the second sequence number. Data is written to the first storage device and the second storage device. Then, a second set of header information is written to a first storage device and a second storage device. The second set of header information includes a first sequence number and a second sequence number, in which the second set of header information includes a second sequence number incremented to correspond to the first sequence number.

In a second aspect of the present invention, a data storage system includes a first data storage device and a second data storage device suitable for storing electronic data. A data storage controller suitable for performing a program of instructions is coupled to the first data storage device and the second data storage device. The program of instruction configures the data storage controller to write a first set of header information to the first storage device and the second storage device. The first set of header information includes a first sequence number incremented to indicate initiation of a write operation. Data is written to the first storage device and the second storage device. A second set of header information is written to the first storage device and the second storage device, wherein the second set of header information includes a second sequence number incremented to indicate completion of the data write.

In a third aspect of the present invention, a method, includes obtaining a database identifier from a data storage device included in a data storage system. The obtained database identifier is compared with a previously stored database identifier, wherein if the obtained data identifier does not correspond with a previously stored database identifier, the data storage device is not native to a data storage system It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 5, exemplary embodiments of the present invention are shown. The present invention may be utilized in creating an N-Way-Mirrored storage device in which individual drives may be removed and inserted during normal operation, when the device is powered off, and the like. Additionally, the present invention allows for data from other devices of the same type to be imported into the storage device.

Figure 1A:
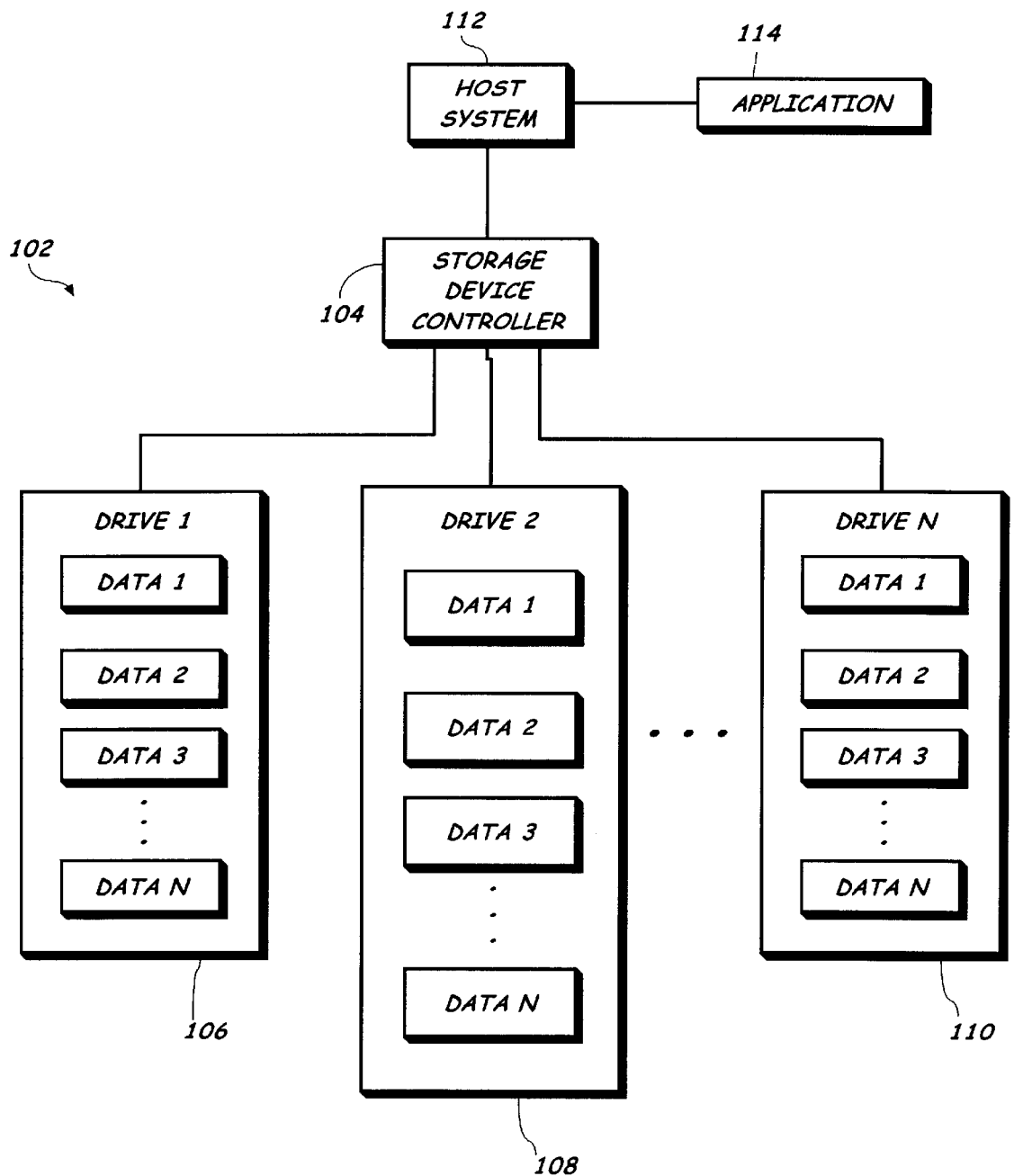
FIG. 1A is a block diagram illustrating an exemplary embodiment of the present invention wherein a storage system including up to N storage devices is communicatively coupled to a host system including an application suitable for utilizing the storage system.

Referring now to FIG. 1A, an embodiment of the present invention is shown wherein a data storage system 102 operable to employ the present invention is described. A data storage system 102 may include a storage device controller 104 and a number of storage devices, such as Drive One 106, Drive Two 108 and up to Drive N 110 as contemplated by a person of ordinary skill in the art. The storage device controller 104 receives data from a host system 112 and stores the data across to storage devices, such as the drives 106, 108 & 110, to ensure data integrity and access to the data should one of the storage devices become unavailable, such as through a drive malfunction, data corruption, and the like condition. However, when writing data to the drives, an interruption, error condition, newly accessible drive, and the like may be encountered, thereby calling into question the validity of the data. For example, by adding a new drive and/or encountering an interruption during a write to the storage devices, a storage device controller 104, host system 112, application 114, and the like, must determine which data set is valid.

Figure 1B:
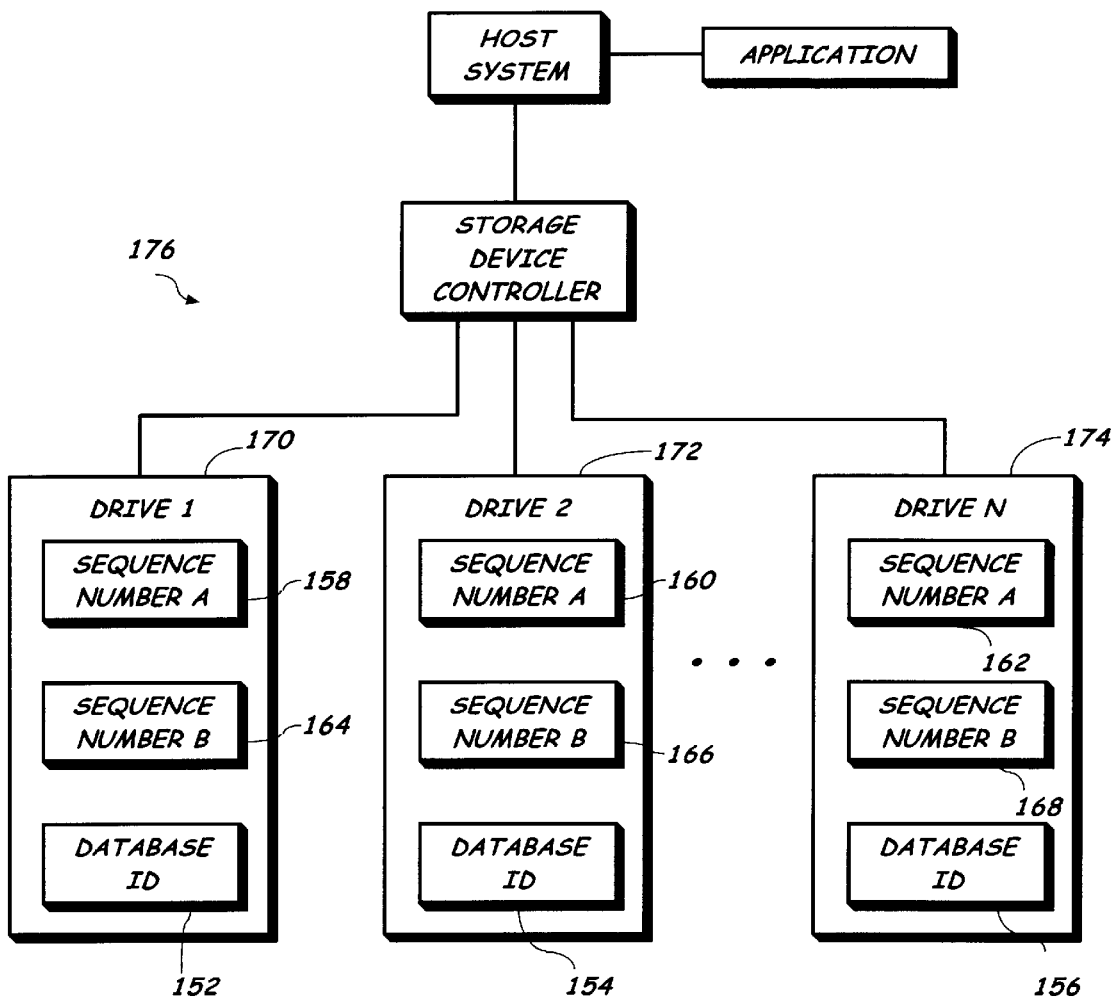
FIG. 1B is a block diagram depicting an embodiment of the present invention wherein three distinct pieces of information are provided to establish a valid data set and determine if recovery operations are needed.

In accordance with the present invention three distinct pieces of information are utilized to establish a valid data set and determine if recovery operations are needed, as shown in the embodiment depicted in FIG. 1B. The three pieces of information include a database ID 152, 154 & 156, and two sequence numbers, which for purposes of the present discussion are labeled sequence number "A" 158, 160 & 162 and sequence number "B" 164, 166 & 168. This data may be stored in a special location on each of the drives 170, 172 & 174 in the database 176. The sequence numbers are used to detect interruptions from a "critical write" operation. The information may also be utilized to detect if foreign data has been introduced and thus, whether a merge operation is required.

The database ID is a unique value that may be computed based on the storage device serial number and a time stamp when the database is created, and other like methods of creating a unique value as contemplated by a person of ordinary skill in the art without departing from the spirit and scope of the present invention. A database ID may be included to make it possible for an entire foreign database to be recognized and merged into the native system (i.e. when one or more drives from a foreign system are inserted into a native system).

In general, users of an N-Way-Mirrored storage facility may write data using a variety of mechanisms. For example, in contemplated embodiments, a write may be performed using one of two mechanisms, namely non-critical and critical writes. Non-critical writes are typically write operations for which interruptions, or partially-completed operations, need not be detected/corrected. However, critical writes may include operations for which interruptions must be detected and/or corrected. Correction may include ensuring that all copies of the data on the N-Way-Mirrored storage devices are the same, even if the data represents only a partially completed critical write operation.

One application for which these two different types of writes may be employed is in a database system. Insertions of individual records, such as segments of data, into the database generally require that the data record is written, and then an index structure is modified to reference the data record. The write of the data record may usually be handled in a non-critical fashion, since an interruption of the operation will simply cause the system to restart before any index structure points to the new record (although critical data record writes are also contemplated by the present invention). In non-critical instances, it may not matter if an N-Way-Mirrored device contains mismatched copies of a data record. For example, since no index record points to the data record yet, the database will not try to access that data record.

However, in most instances, an index record update would generally be handled as a critical write. Interruption of the index record update may have to be detected at restart time to ensure that all copies of the data on the N-Way-Mirrored device are the same. Even if fully-mirrored matching data represents a partially-completed write, the database system may be prepared to recognize this condition and handle it accordingly, such as by utilizing a cyclic redundancy check (CRC) computation/analysis (for detection) and rollback/rollforward (for data integrity).

Therefore, an important consideration in the storage of critical data is that, preferably, all N copies of the data are the same. Consequently, the return of a consistent result to a client se of the N-Way-Mirrored device may be ensured, regardless of which of the N copies is used to satisfy a read request.

Figure 2:
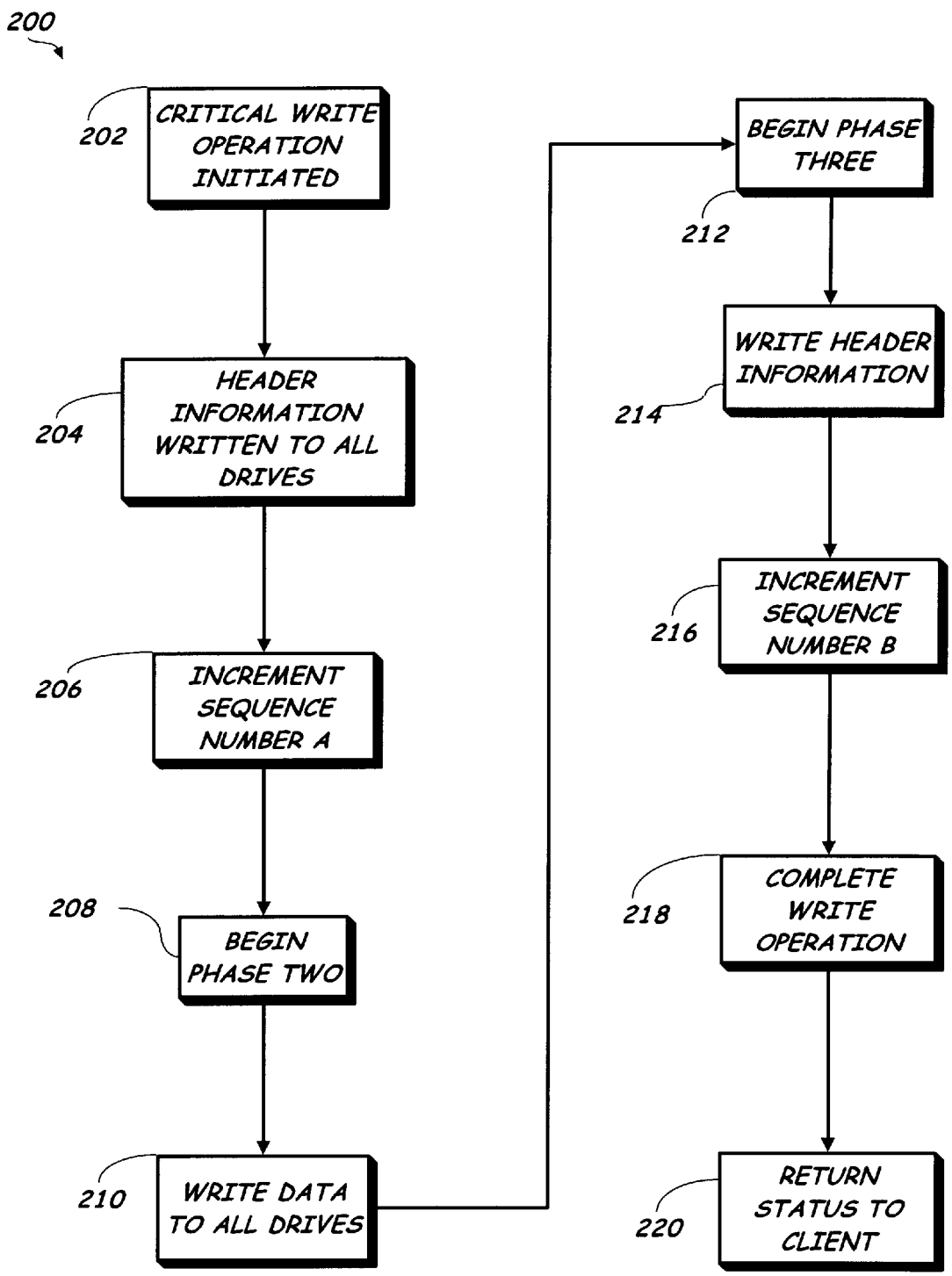
FIG. 2 is a flow diagram of an exemplary method of the present invention wherein three atomic operations are performed to accomplish a critical write operation.

Referring now to FIG. 2, an exemplary method 200 of the present invention is shown wherein three operations are performed to accomplish a critical write operation. To implement this model, a critical write is performed as three atomic operations, which allows detection of interruptions, identification of when the interruptions occurred and recovery from them.

In a normal operating mode, both sequence numbers on all drives will be the same. When a "critical write" operation is initiated 202, header information may be written to all drives 204 with the sequence number A incremented 206 by one. This is done as a single atomic operation before phase two is allowed to begin 208. Phase two is the data phase in which all data is written out to all drives 210. When the data is completely written to all drives, phase three is allowed to begin 212. In phase three, the header information is written again 214 and in this phase sequence number B is incremented 216 to once again match sequence number A. Only when all three phases have completed is the write operation allowed to complete 218 and return status to a client 220, such as an application 114 operating on a host system 112 as depicted in FIG. 1A.

Referring generally now to FIGS. 3A, 3B, 3C and 3D, exemplary embodiments of the present invention are shown wherein an interrupt has occurred. An interruption may occur in any of the three phases as described in FIG. 2. However, by utilizing the present invention, the occurrence of the interruption may be detected and recovered. Sequence number configurations corresponding to exemplary interruptions are shown in the corresponding figures.

Figure 3A:
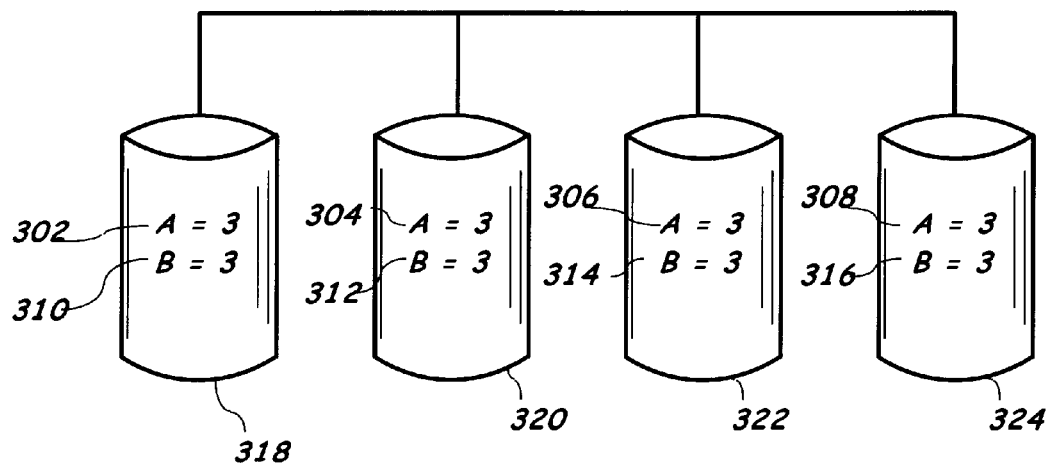
FIGS. 3A, 3B, 3C and 3D are illustrations depicting embodiments of the present invention wherein an interrupt has occurred and sequence number configurations corresponding to exemplary interruptions are shown in the corresponding figures.

For example, as shown in the embodiment depicted in FIG. 3A, a sequence number configuration of an uninterrupted condition is shown. The interruptions may be detected when a device executes a start-of-day (i.e. restart) procedure by examining both sequence number "A" 302, 304, 306 & 308 and "B" 310, 312, 314 & 316 as stored on the drives. If the sequence numbers 302–316 on the drives 318, 320, 322 & 324 are the same, then an interruption has not occurred and the device may begin normal operation.

Figure 3B:
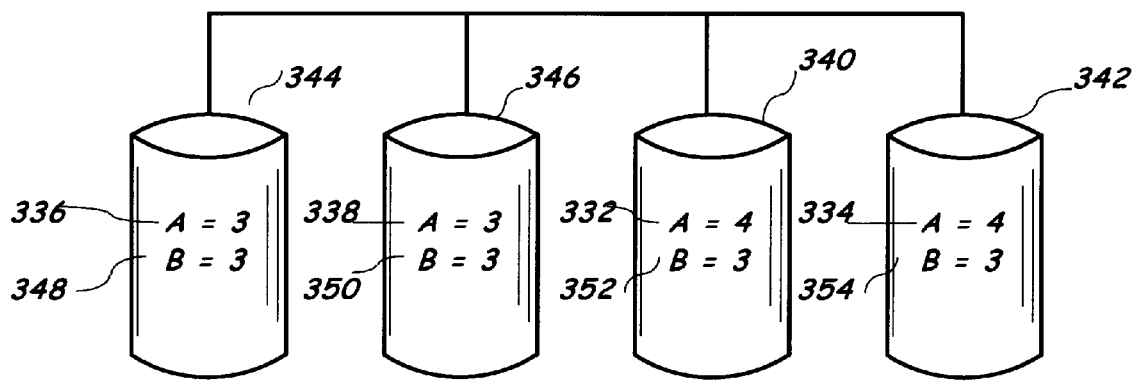

Referring now to FIG. 3B, an embodiment of the present invention is shown wherein sequence numbers resulting from an interruption occurring in a first phase of a critical write are shown. If an interruption occurred during a first phase of a critical write, one or more of sequence number A 332 & 334 of drives 340 & 342, which were updated but an interruption occurred before drives 344 & 346 could likewise be updated, will be greater than the other sequence number A's 336 & 338. In this instance, an update of headers, wherein sequence number A 332 & 334 of the drives 340 & 342 having the higher sequence number A value is rewritten to match previous values of sequence number 336 & 338 of the non-updated drives 344 & 346 is sufficient to correct database integrity. Further verification that the interruption occurred during the first phase may be found by examining the second set of sequence numbers, labeled sequence number B. For example, if sequence number B 348, 350, 352 & 354 of the drives matched the lower valued sequence number A 336 & 338.

Figure 3C:
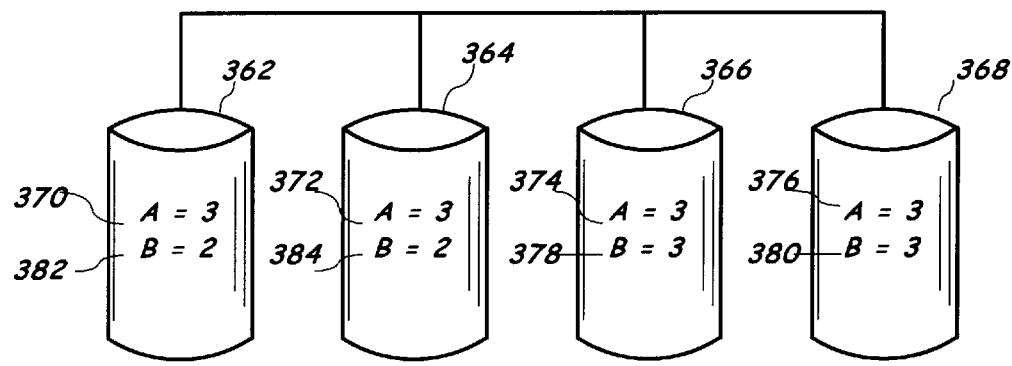

Similarly, if an interruption occurred in phase three, all of the sequence number A's will match, but some of the sequence number B's will match the A's and some will not have been incremented. For example, as shown in FIG. 3C, an embodiment 360 of the present invention is shown wherein a first set of sequence numbers of a drive match each other and at least one sequence number of a second set of sequence numbers, with at least one additional sequence number of the second set of sequence number not matching another sequence number of the second set.

For instance, a set of four drives 362, 364, 366 & 368 may have a first set of sequence numbers 370, 372, 374 & 376 that match. A second set of sequence numbers, sequence number B 378 & 380, of at least one drive, in this instance two drives 366 & 368, match the first sequence numbers, sequence number A 370, 372, 374 & 376.

Figure 3D:
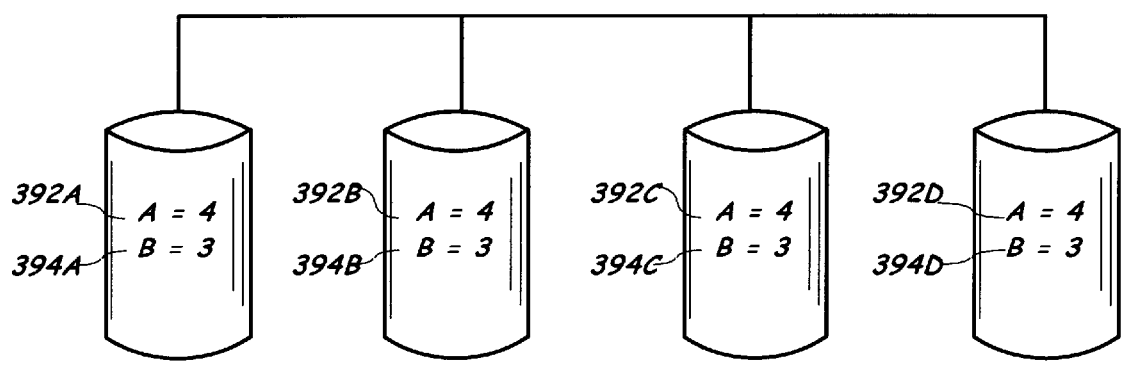

However, other sequence numbers of the second set of sequence numbers were not incremented. In this instance, sequence number B 382 & 384 is one less than the other sequence number, such as sequence number A 370, 372, 374 & 376 as well as the other sequence number B 378 & 380 of the two incremented drives 366 & 368. As discussed in the previous embodiment shown in FIG. 3B, an update of the headers, wherein sequence number A 370, 372, 374 & 376 and sequence number B 378 & 380 having the higher sequence number values, are rewritten to match previous values of sequence number B 382 & 384 to correct database integrity. Referring now to FIG. 3D, an embodiment of the present invention is shown wherein sequence numbers resulting from an interruption occurring in a second phase of a critical write are shown. An interruption in phase two is detected if all sequence number A's 392A, 392B, 392C & 392D match and all sequence number B's 394A, 394B, 394C & 394D match, but sequence number A's 392A, 392B, 392C & 392D and sequence number B's 394A, 394B, 394C & 394D do not match each other. In this case, a resynchronization of database may be performed. For example, resynchronizing may include performing full copies to all drives to ensure that they all have the same content.

Invalid data, such as stale data, may also be detected using the sequence numbers. For instance, as shown in the exemplary embodiment illustrated in FIG. 4A, a plurality of drives including at least one drive having invalid data may be detected by utilizing the present invention. If a drive 402 contains a sequence number, such as sequence number A 404, that is more than one less than the largest corresponding sequence number, such as other sequence number A's 406, 408 & 410 contained in the storage device (the sequence number is more than one increment of the other sequence numbers), then the drive contains stale data. To correct this condition, the drive 402 and/or corresponding data segment to the sequence number 404 may be overwritten to match the valid drives. Although sequence number A is described, it should be apparent to a person of ordinary skill in the art that a similar analysis of sequence number B may be performed without departing from the spirit and scope of the present invention.

Figure 4A:
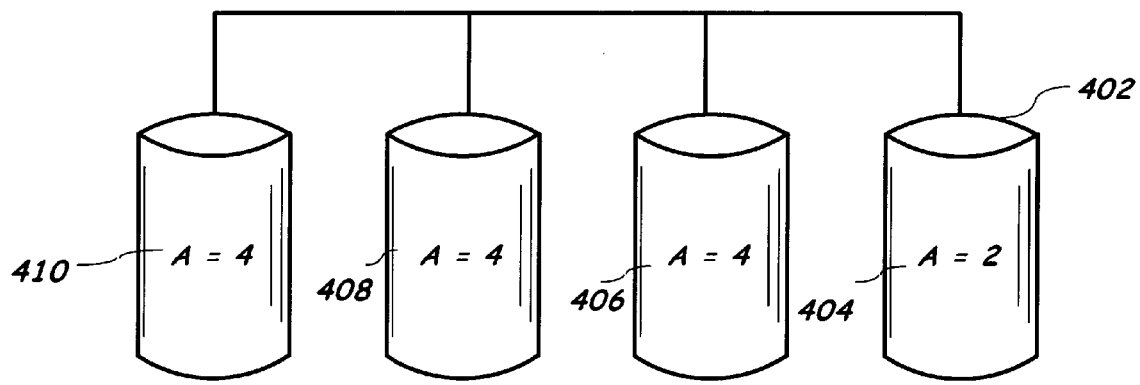
FIG. 4A is an illustration of a plurality of drives including at least one drive having invalid data being detected by utilizing the present invention.
Figure 4B:
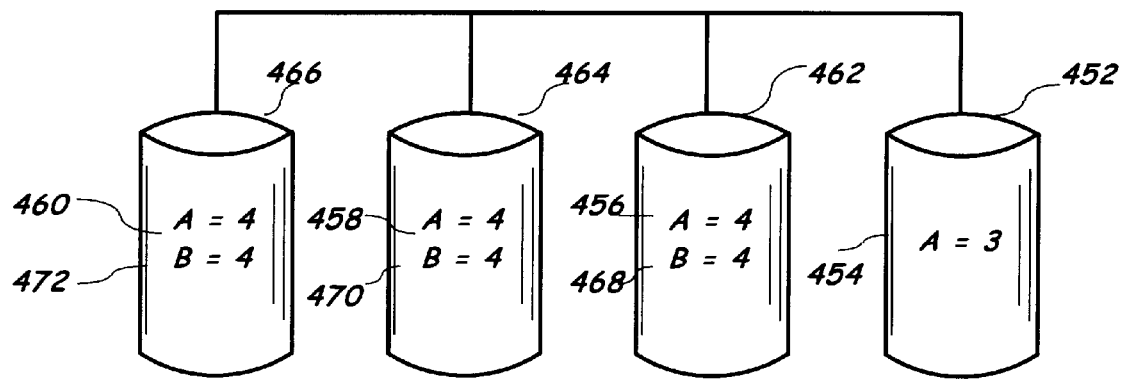
FIG. 4B. illustrates an alternative embodiment of the present invention which can be utilized to detect stale data.

Likewise, the present invention may also be utilized to detect stale data as shown in the embodiment depicted in FIG. 4B. If a drive 452 contains a sequence number A 454 that is one less than the largest sequence number A, such as other sequence number A 456, 458 & 460 of at least one other drive 462, 464 & 466 of the system, and the system contains a drive (or drives) whose sequence number B 468, 470 & 472 matches the largest sequence number A 456, 458 & 460, then this drive 452 is also detected as containing stale data, and may be rewritten as described previously.

Figure 5:
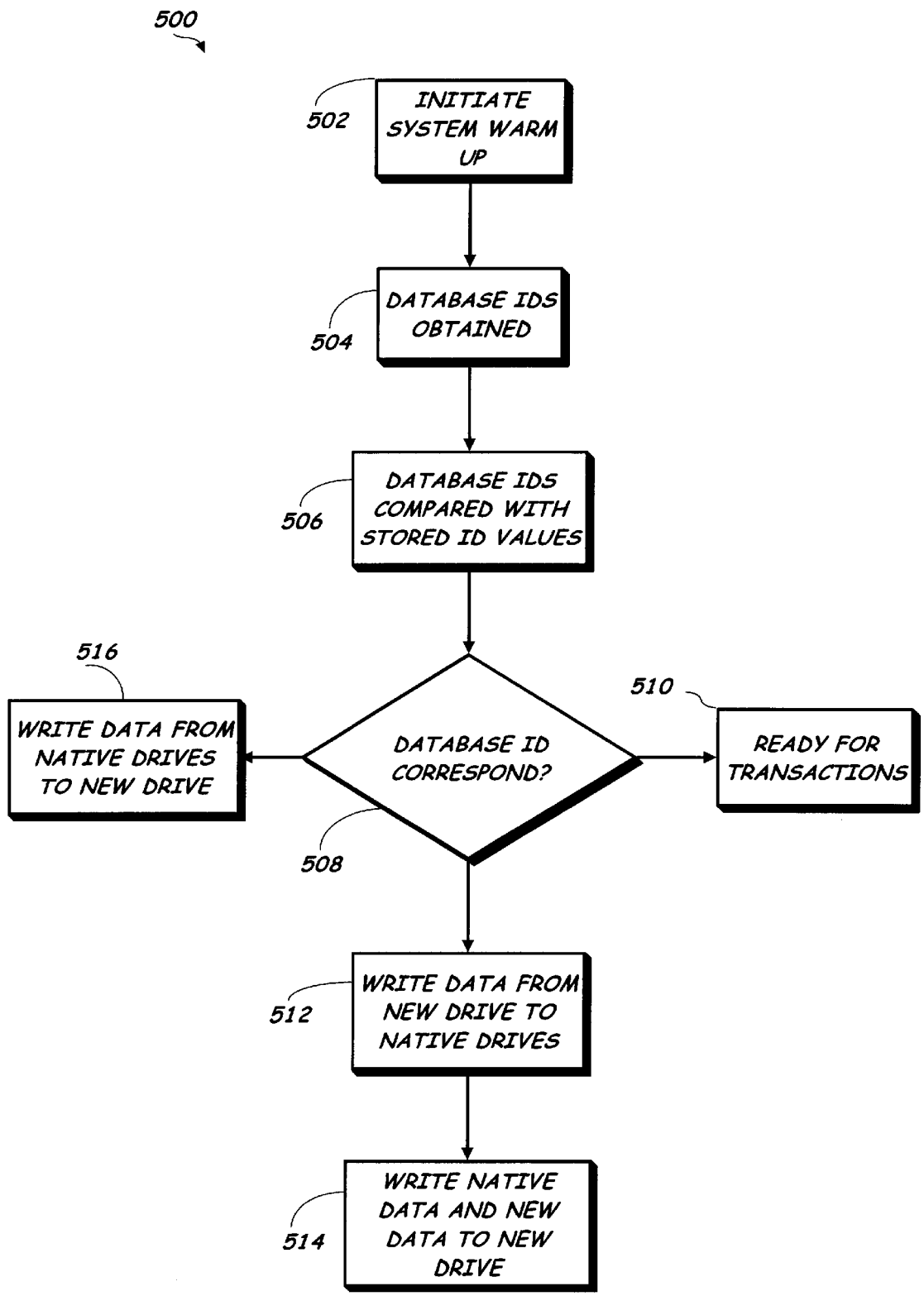
FIG. 5 is a flow diagram depicting an exemplary method of the present invention wherein a database ID is utilized to detect a non-native storage device.

Referring now to FIG. 5, an exemplary method 500 of the present invention is shown wherein a database ID is utilized to detect a new drive. For example, a database ID may be used to determine if a drive has been imported from another database. If drives are detected from another (foreign) N-Way-Mirrored device, the drives may be grouped together and the imported data merged into the native system. When this operation is complete, the drives are then overwritten with the data from the native database and integrated into the N-Way-Mirrored device for all ensuing read/write operations.

For example, a storage system warm up is initiated in step or block 502. Database IDs are obtained in step or block 504 from the corresponding drives, such as the drives and database IDs shown in FIG. 1B. The database ID from each drive is compared with stored ID values in step or block 506. The database ID is a unique value that may be computed based on the storage device serial number and a time stamp when the database is created, and other like methods of creating a unique value as contemplated by a person of ordinary skill in the art without departing from the spirit and scope of the present invention. If the database IDs correspond as determined in step or block 508, all the drives are native to the storage system and thus, the storage system is ready to perform transactions in step or block 510.

However, if the database IDs do not correspond in step or block 508, data may be written from the new drive to native drives to be included with preexisting data on the other native drives in step or block 512. Thus, the database ID enables an entire foreign database to be recognized and merged into the native system. Further, it may be desirable to then write both sets of data back to the new drive so that all the available drives correspond in step or block 514. For example, when one or more drives from a foreign system are inserted into a native system, and the data included on the drives, as well as the drives themselves, are to be included in the system.

Additionally, in some instances it may be preferable to overwrite the new drive. In this case, data may be written from the native drives to the new drive in step or block 516 so that data included on the drives 106, 108 & 110 (FIG. 1A) of the data storage system 102 (FIG. 1A) correspond, without utilizing data as initially included on the new drive.

Although incrementing is described in which values increase, it should be apparent to a person of ordinary skill in the art that the present invention contemplates reducing values and like methods utilized to provide a sequence. Further, an increment contemplates any value, which may be utilized to indicate a change from an initial value to a second changed value. Moreover, although the matching of the first sequence number and the second sequence number is described, it should be apparent that one to one correspondence between the values is not required, as the present invention may employ a known difference between sequence numbers to determine if a write operation has been performed, interrupted, corrupted, and the like, and other like methods of comparison and correspondence as contemplated by a person of ordinary skill in the art.

It is believed that the method of managing critical data in an N-Way mirrored storage device of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form hereinbefore described being merely an explanatory embodiment thereof. It is the intention of the following claims to encompass and include such changes.

What is claimed is:

1. A method of performing a write to data storage system including a first storage device and a second storage device, comprising:

writing a first set of header information to a first storage device and a second storage device, wherein the first set of header information includes a first sequence number and a second sequence number, in which the first set of header information includes the first sequence number incremented to indicate a change from the second sequence number;

writing data to the first storage device and the second storage device; and writing a second set of header information to the first storage device and the second storage device, wherein the second set of header information includes a first sequence number and a second sequence number, in which the second set of header information includes the second sequence number incremented to correspond to the first sequence number.

2. The method as described in claim 1, further comprising returning status of completion of writing the second set of header information.

3. The method as described in claim 1, wherein writing data to the first storage device and the second storage device is performed after completion of writing the first set of header information.

4. The method as described in claim 1, wherein writing the second set of header information is started after completion of writing data to the first storage device and the second storage device.

5. The method as described in claim 1, wherein the data being written to the first storage device and the second storage device includes a database transaction.

6. The method as described in claim 1, further comprising detecting and recovering from an interruption occurring during writing the first set of header information, data, or the second set of header information to the first storage device and the second storage device.

7. The method as described in claim 6, wherein the interruption is detected by examining the first sequence number and the second sequence number stored on the first storage device and the second storage device, wherein if the first sequence number stored on the first storage device is one increment greater than the first sequence number stored on the second storage device and the second sequence number stored on the first storage device and the second storage device match the first sequence number stored on the second storage device, the recovering from an interruption includes writing header information matching the first sequence number stored on the second storage device to the first storage device.

8. The method as described in claim 6, wherein the interruption is detected by examining the first sequence number and the second sequence number stored on the first storage device and the second storage device, wherein if the first sequence number stored on the first storage device matches the first sequence number stored on the second storage device; and the second sequence number stored on the first storage device matches the first sequence number stored on the first storage device and the second storage device; and the second sequence number stored on the second storage device is one increment lower than the second sequence number stored on the first storage device, the recovering from an interruption includes writing header information matching the second sequence number stored on the second device to the first storage device and the second storage device, so that the first storage device stores the first sequence number and the second sequence number stored on the second storage device, as well as writing header information so that the first sequence number stored on the second storage device matches the second sequence number stored on the second storage device.

9. The method as described in claim 6, wherein the interruption is detected by examining the first sequence number and the second sequence number stored on the first storage device and the second storage device, wherein if the first sequence number stored on the first storage device and the second storage device match, and the second sequence number stored on the first storage device and the second storage device match, but the first sequence number does not match the second sequence number, the recovering from an interruption includes performing a resynchronization.

10. The method as described in claim 1, wherein invalid data is detected on the first storage device or the second storage device.

11. The method as described in claim 10, wherein invalid data is detected by examining the first sequence numbers stored on the first storage device and the second storage device, wherein if the first sequence number stored on the first storage device is more than one increment lower than the first sequence number stored on the second storage device, the header information from the second storage device is written to the first storage device.

12. The method as described in claim 10, wherein invalid data is detected by examining the first sequence number and the second sequence number stored on the first storage device and the second storage device, wherein if the first sequence number stored on the first storage device is one increment lower than the first sequence number stored on the second storage device, and the second sequence number stored on the second storage device matches the first sequence number stored on the second storage device, the header information from the second storage device is written to the first storage device.

13. A data storage system suitable for performing a write of data, comprising:

a first data storage device suitable for storing data;

a second data storage device suitable for storing data;

a data storage controller coupled to the first storage device and the second storage device, the data storage controller suitable for performing a program of instructions, wherein the program of instructions configures the data storage controller to write a first set of header information to the first storage device and the second storage device, wherein the first set of header information includes a first sequence number incremented to indicate initiation of a write operation; to write data to the first storage device and the second storage device; and to write a second set of header information to the first storage device and the second storage device, wherein the second set of header information includes a second sequence number incremented to indicate completion of the write operation.

14. The data storage system as described in claim 13, further comprising a data storage controller suitable for performing a returning status of completion operation, after writing the second set of header information, to an application requesting a database transaction.

15. The data storage system as described in claim 13, wherein writing data to the first storage device and the second storage device is performed after completion of writing the first set of header information.

16. The data storage system as described in claim 13, wherein writing the second set of header information is started after completion of writing data to the first storage device and the second storage device.

17. The data storage system as described in claim 13, wherein the data being written to the first storage device and the second storage device includes a database transaction.

18. The data storage system as described in claim 13, further comprising detecting and recovering from an interruption occurring during writing the first set of header information, data, or the second set of header information to the first storage device and the second storage device.

19. The data storage system as described in claim 18, wherein the interruption is detected by examining the first sequence number and the second sequence number stored on the first storage device and the second storage device, wherein if the first sequence number stored on the first storage device is one increment greater than the first sequence number stored on the second storage device and the second sequence numbers stored on the first storage device and the second storage device match the first sequence number stored on the second storage device, the recovering from an interruption includes writing header information matching the first sequence number stored on the second storage device to the first storage device.

20. The data storage system as described in claim 18, wherein the interruption is detected by examining the first sequence number and the second sequence number stored on the first storage device and the second storage device, wherein if the first sequence number stored on the first storage device matches the first sequence number stored on the second storage device; and the second sequence number stored on the first storage device matches the first sequence numbers stored on the first storage device and the second storage device; and the second sequence number stored on the second storage device is one increment lower than the second sequence number stored on the first storage device, the recovering from an interruption includes writing header information matching the second sequence number stored on the second device to the first storage device and the second storage device, wherein the first storage device includes the first sequence number and second sequence number stored on the second storage device, as well as writing header information wherein the first sequence number stored on the second storage device matches the second sequence number stored on the second storage device.

21. The data storage system as described in claim 18, wherein the interruption is detected by examining the first sequence number and the second sequence number stored on the first storage device and the second storage device, wherein if the first sequence number stored on the first storage device and the second storage device match, and the second sequence number stored on the first storage device and the second storage device match, but the first sequence number do not match the second sequence number, the recovering from an interruption includes performing a resynchronization.

22. The data storage system as described in claim 13, wherein invalid data is detected on the first storage device or the second storage device.

23. The data storage system as described in claim 22, wherein invalid data is detected by examining the first sequence number stored on the first storage device and the second storage device, wherein if the first sequence number stored on the first storage device is more than one increment lower than the first sequence number stored on the second storage device, the header information from the second storage device is written to the first storage device.

24. The data storage system as described in claim 22, wherein invalid data is detected by examining the first sequence number and the second sequence number stored on the first storage device and the second storage device, wherein if the first sequence number stored on the first storage device is one increment lower than the first sequence number stored on the second storage device, and the second sequence number stored on the second storage device matches the first sequence number stored on the second storage device, the header information from the second storage device is written to the first storage device.

* * * * *